United States Patent
Legnain et al.

(10) Patent No.: US 7,649,994 B1
(45) Date of Patent: Jan. 19, 2010

(54) SYSTEM AND METHOD FOR DECODING CDMA QUALITY CHANNEL

(75) Inventors: Abdelgader Legnain, Nepean (CA); Xixian Chen, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 842 days.

(21) Appl. No.: 10/697,309

(22) Filed: Oct. 31, 2003

Related U.S. Application Data (60) Provisional application No. 60/422,972, filed on Nov. 1, 2002.

(51) Int. Cl.
- H04N 7/167 (2006.01)
- H04N 7/12 (2006.01)
- H04N 11/02 (2006.01)
- H04N 11/04 (2006.01)
- H04K 1/00 (2006.01)
- G10L 21/04 (2006.01)
- G06F 7/00 (2006.01)
- G06F 15/00 (2006.01)

(52) U.S. Cl. .................... 380/217; 380/269; 348/384.1; 704/503; 708/203

(58) Field of Classification Search .................. 380/217
See application file for complete search history.

(56) References Cited

U.S. PATENT DOCUMENTS

| | | | | |
|---|---|---|---|---|
| 4,446,530 A | * | 5/1984 | Tsuboka | 708/400 |
| 5,103,459 A | * | 4/1992 | Gilhousen et al. | 370/206 |
| 5,136,612 A | * | 8/1992 | Bi | 370/342 |
| 5,204,874 A | * | 4/1993 | Falconer et al. | 375/130 |
| 5,237,586 A | * | 8/1993 | Bottomley | 370/206 |
| 5,267,261 A | * | 11/1993 | Blakeney et al. | 370/332 |
| 5,353,352 A | * | 10/1994 | Dent et al. | 380/37 |
| 5,383,219 A | * | 1/1995 | Wheatley et al. | 370/342 |
| 5,406,629 A | * | 4/1995 | Harrison et al. | 380/34 |
| 5,550,809 A | * | 8/1996 | Bottomley et al. | 370/342 |
| 6,430,212 B1 | * | 8/2002 | Alisobhani et al. | 375/141 |
| 6,728,296 B1 | * | 4/2004 | Yung | 375/141 |

\* cited by examiner

*Primary Examiner*—Nasser G Moazzami
*Assistant Examiner*—Oscar A Louie (57) ABSTRACT

A method of decoding symbols in which a first codeword has been spread by a second codeword to recover first information and second information is provided. The decoding occurs jointly, with an overall output determining both the first and second information. A first parallel code multiplying operation for each codeword of the second code is followed by a second parallel code multiplying operation for the first code. An overall maximum output of the second parallel code multiplying operations determines the output information.

28 Claims, 8 Drawing Sheets

SYSTEM AND METHOD FOR DECODING CDMA QUALITY CHANNEL

RELATED APPLICATIONS

This application claims the benefit of U.S. Provisional Application No. 60/422,972 filed on Nov. 1, 2002.

FIELD OF THE INVENTION

The invention relates to systems and methods for decoding CDMA (Code Division Multiple Access) quality channels.

BACKGROUND OF THE INVENTION

The R-CQICH (Reverse-Channel Quality Indicator Channel) is a newly added channel for the CDMA-2000 Release C Standard. In such systems, each mobile station operating within the coverage area of a given base station will measure the forward link channel quality and send this information back to the base station. This information consists of a full channel quality information transmitted either during the first slot, the first two slots or the first four slots in a frame. For the remainder of the slots in the frame, only a differential update is transmitted. There are typically 16 slots in a frame. For the full measurement, a repetition factor of 1, 2 or 4 is used meaning that exactly the same measurement is transmitted a number of times indicated by the repetition factor.

The R-CQICH is a continuous channel on the reverse link. In addition to conveying channel quality information, it conveys best serving sector information from the Walsh cover used to transmit the information. More specifically, the mobile station will make a channel quality measurement for each base station/sector that it can detect. It then determines the best channel quality of the group of measurements, and transmits, on the R-CQICH, the identity of the base station for which that measurement was made together with the channel quality indicator.

A Walsh code cover is used in transmitting the R-CQICH. Each sector has its own Walsh cover 10. The mobile station identifies the particular sector for which the channel quality is best by using the Walsh code cover of that sector in generating the R-CQICH.

Figure 1:
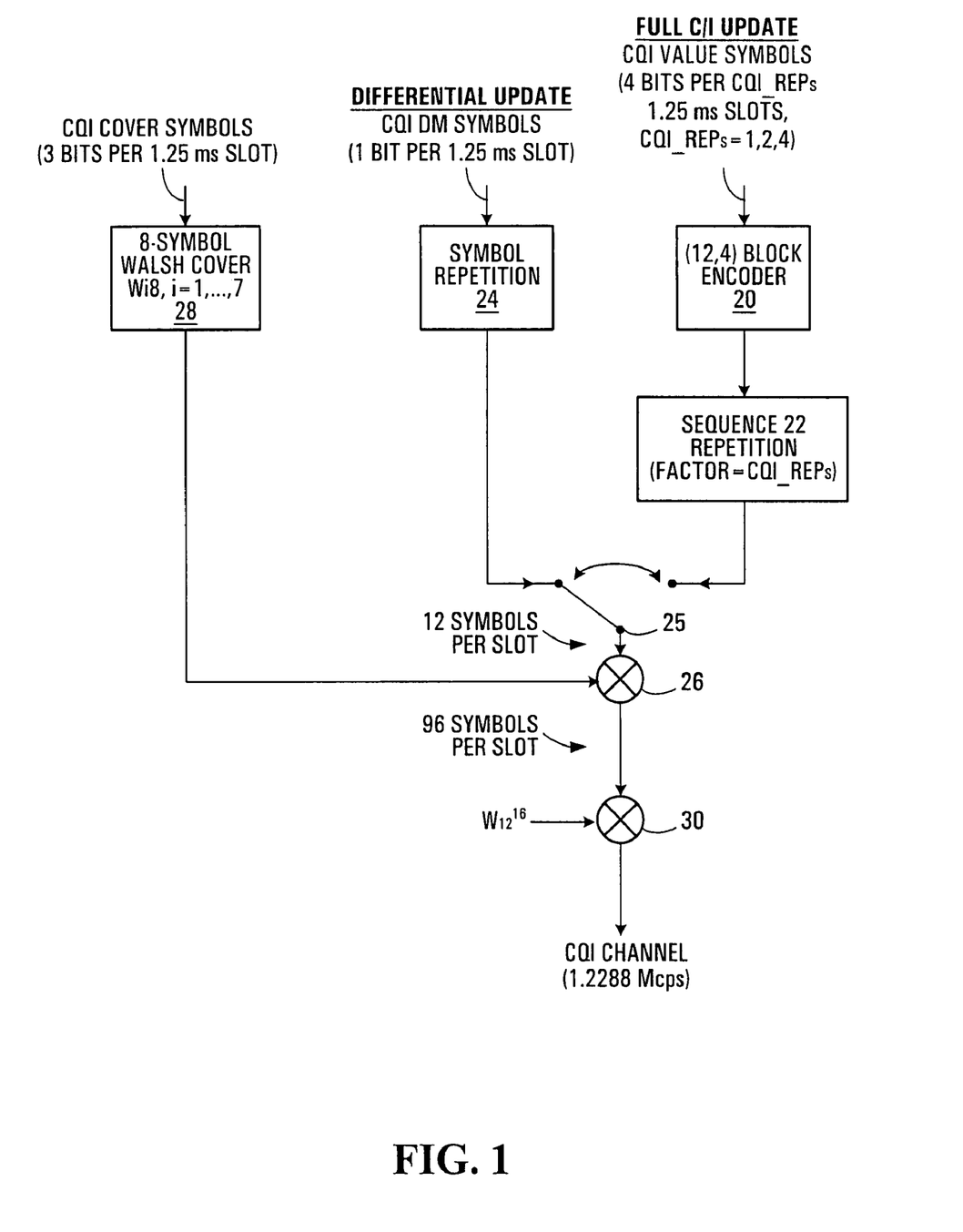
FIG. 1 is a block diagram of how the R-CQICH is generated in accordance with the CDMA-2000 Release C Standard.

FIG. 1 shows a block diagram of the R-CQICH channel generation structure provided by CDMA-2000 Release C. For full C/I updates, 4 bits per update are fed to a (12,4) block encoder 20 which produces a 12 bit output. The output of this is then fed to sequence repetition block 22 which repeats the sequence 1, 2 or 4 times as indicated above. For full C/I updates, the switch 25 is switched to connect the output of the sequence repetition 22 to the multiplier 26. The output of the sequence repetition 22 is then multiplied with multiplier 26 by the 8-symbol Walsh cover as indicated at 28. The 8-symbol Walsh cover will indicate which sector will transmit to the mobile on the forward link for the next slot. Finally, the output of the multiplier 26 is multiplied by a 16-symbol Walsh cover as indicated at 30. 96 symbols per slot are output by a multiplier 26. For differential C/I updates, the switch 25 is switched to connect the output of the symbol repetition 24 to the multiplier 26. For differential C/I updates, a single CQI symbol is input to symbol repetition function 24. This is in the form of 1 bit per 1.25 millisecond slot. This single bit is then simply repeated 12 times and output to multiplier 26. It can be seen that a given slot is either used to transmit a full C/I update or the differential C/I update.

Figure 3:
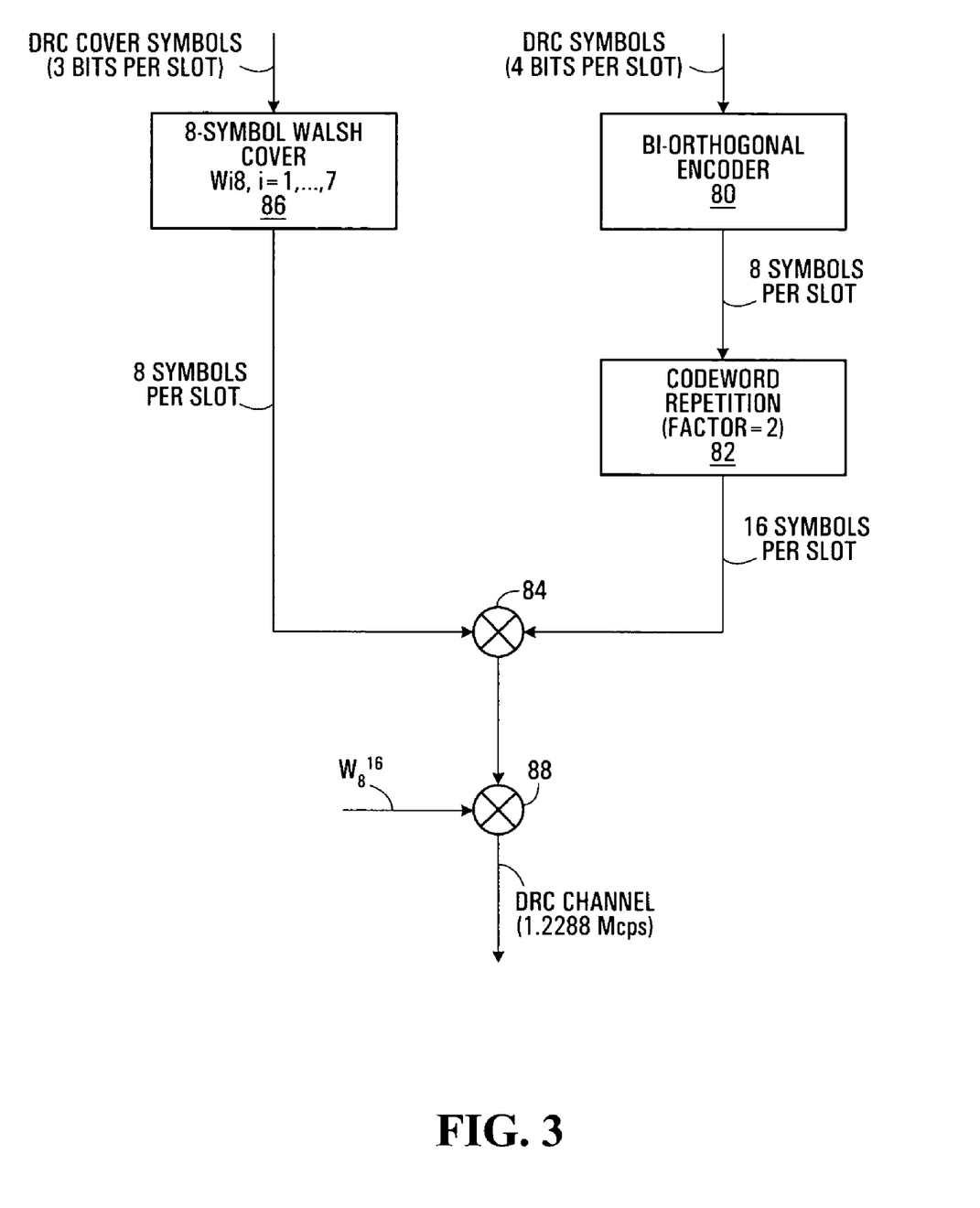
FIG. 3 is a block diagram of an encoder for a data rate control channel as defined in IS 856 Air Interface Standards

It is noted that FIG. 1 is specific to CDMA-2000 Release C 1×EV-DV solutions. An analogous channel has been proposed for IS 856 1×EV-DO applications. In this case, rather than calling the channel the R-CQICH, the channel is called the DRC (Data Rate Control) channel. The structure of the DRC channel is very similar to that of the R-CQICH. FIG. 3 is a block diagram of DRC generation for DO applications. In this case, the DRC symbols are data rate control symbols consisting of four bits per slot. These are fed into a bi-orthogonal encoder 80 which produces eight symbols per slot. This goes through a code word repetition block with factor=2 as indicated at 82. This produces 16 symbols per slot. This is multiplied at 84 by the eight symbol Walsh cover of the particular sector being reported. This produces 128 symbols per slot. This is then spread with a $w_8^{16}$ cover at 88 to produce a DRC channel having a rate of 1.2288 Mcps. This second Walsh cover is used to indicate the channel is the DRC channel.

SUMMARY OF THE INVENTION

According to one broad aspect, the invention provides a method of decoding M×N (symbols in which a first codeword of length N of a first set of K codewords has been spread by a second codeword of length M of a second set of L codewords, the first codeword identifying a first information and the second codeword identifying a second information, the method comprising: for each set of M consecutive symbols, performing a first parallel code multiplying operation by multiplying the M symbols by each of the L codewords of the second code, thereby producing L first output symbols, each of the L output first output symbols being associated with one of the L codewords; for each of at least one codewords of said set of L codewords: for a set of N consecutive first output symbols associated with the codeword, performing a respective second parallel code multiplying operation by multiplying the set of N consecutive first output symbols by each of the K codewords of the second code to produce a set of K second output symbols, each second output symbol being associated with one of the K codewords and with said codeword of the set of said L codewords; determining an overall maximum of the second output symbols output of said second parallel code multiplying operations.

In some embodiments, the first code is a Walsh code, and the second parallel code multiplying operation comprises a FHT (Fast Hadamard Transform).

In some embodiments, the first code is a truncated Walsh code, the method further comprising padding each set of N consecutive output symbols to a power of 2, wherein the second parallel code multiplying operation comprises a FHT.

In some embodiments, the second code is a Walsh code, and the first parallel code multiplying operation comprises a FHT.

In some embodiments, the second code is an orthogonal code.

In some embodiments, M=8, N=12, L=8, K=16, the second code is an 8-Walsh code, and wherein the first code is a truncated Walsh code in the form of a (12,4) block code which is padded to length 16.

In some embodiments, M=8, N=8, L=8, K=8 the first code is an 8-Walsh code, and the second code is an 8-Walsh code.

In some embodiments, the method further comprises: performing sequence de-repetition prior to said first parallel code multiplying operation.

In some embodiments, the method further comprises: determining the first information from the codeword of the first set of codewords associated with the overall maximum output and determining the second information from the codeword of the second set of codewords associated with the overall maximum output.

In some embodiments, the method further comprises: determining the first information from the codeword of the first set of codewords associated with the overall maximum output and determining the second information from the codeword of the second set of codewords associated with the overall maximum output; wherein the first information comprises a channel quality indication, and wherein the second information comprises a sector identifier.

In some embodiments, the method further comprises: determining the first information from the codeword of the first set of codewords associated with the overall maximum output and determining the second information from the codeword of the second set of codewords associated with the overall maximum output; wherein the first information comprises a data rate control indication, and wherein the second information comprises a sector identifier.

In some embodiments, said second parallel code multiplying operation is performed for at least 2 of the L codewords.

In some embodiments, said second parallel code multiplying operation is performed for all of the L codewords.

In some embodiments, said at least one codeword are fewer than all of the L codewords, and the at least one codeword is selected by accumulating energy after the first parallel code multiplying operation for each possible codeword after the first parallel code multiplying operation, and selecting the at least one codeword having greatest energy.

According to another broad aspect, the invention provides an apparatus for decoding M×N (symbols in which a first codeword of length N of a first set of K codewords has been spread by a second codeword of length M of a second set of L codewords, the first codeword identifying a first information and the second codeword identifying a second information, the apparatus comprising: a first parallel code multiplier which, for each set of M consecutive symbols, performs a first parallel code multiplying operation by multiplying the M symbols by each of the L codewords of the second code, thereby producing L first output symbols, each of the L output first output symbols being associated with one of the L codewords; a second parallel code multiplier which, for each of at least one codewords of said set of L codewords, performs: for a set of N consecutive first output symbols associated with the codeword, a respective second parallel code multiplying operation by multiplying the set of N consecutive first output symbols by each of the K codewords of the second code to produce a set of K second output symbols, each second output symbol being associated with one of the K codewords and with said codeword of the set of said L codewords; wherein an overall maximum of the second output symbols output of said second parallel code multiplying operations is selected.

In some embodiments, the first code is a Walsh code, and the second parallel code multiplying operation comprises a FHT (fast Hadamard transform).

In some embodiments, the first code is a truncated Walsh code, the apparatus being further adapted to pad each set of N consecutive output symbols to a power of 2, wherein the second parallel code multiplier comprises a FHT.

In some embodiments, the second code is a Walsh code, and the first parallel code multiplier comprises a FHT.

In some embodiments, an apparatus further comprises: a sequence de-repetition function adapted to perform sequence de-repetition prior to said first parallel code multiplier.

In some embodiments, the first information comprises a channel quality indication, and wherein the second information comprises a sector identifier.

In some embodiments, the first information comprises a data rate control indication, and wherein the second information comprises a sector identifier.

In some embodiments, said at least one codeword are fewer than all of the L codewords, and the at least one codeword is selected by accumulating energy for each possible codeword after the first parallel code multiplying operation, and selecting the at least one codeword having greatest energy.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 2:
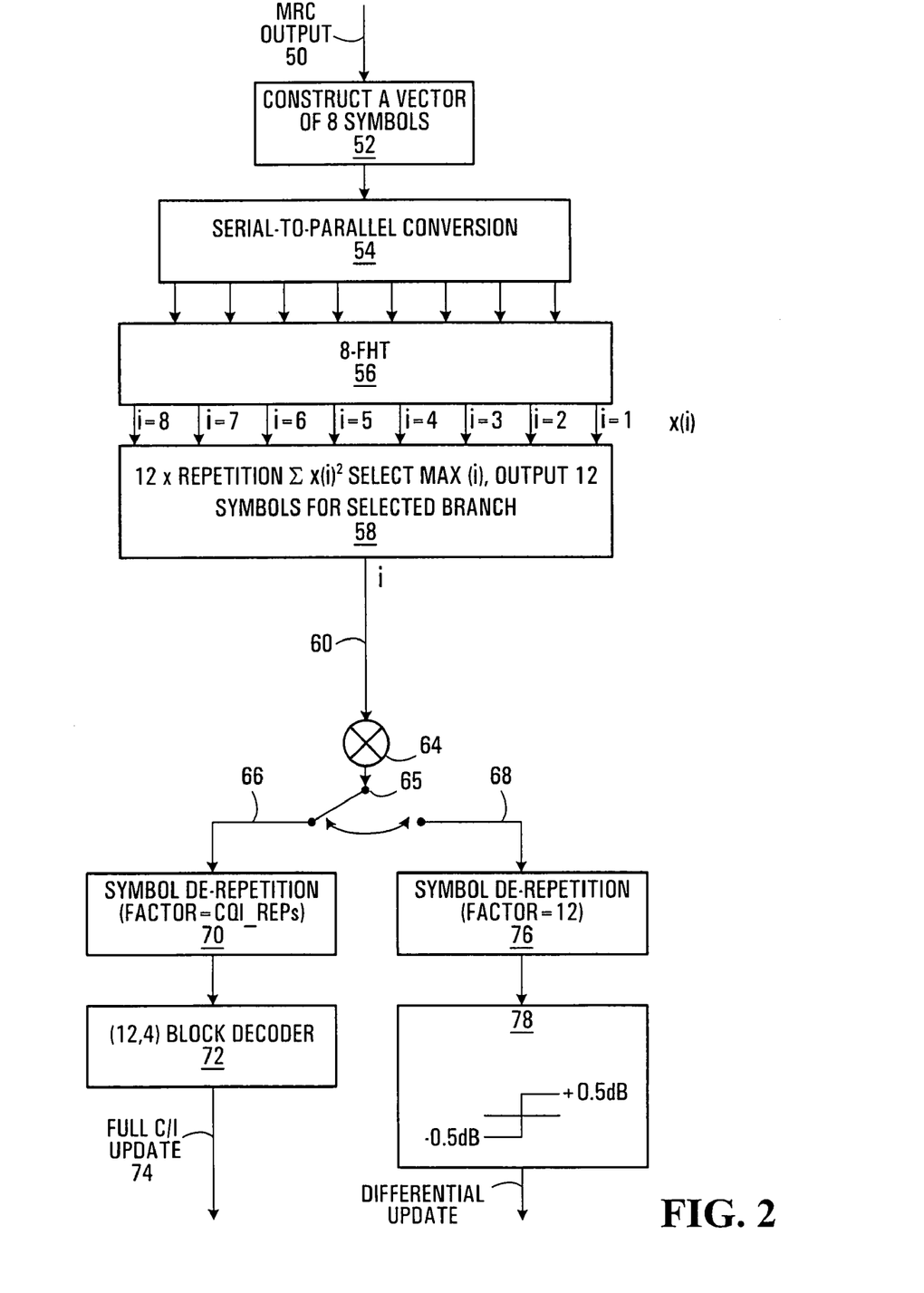
FIG. 2 is a block diagram of a straight forward decoding approach for decoding the R-CQICH of FIG. 1.

FIG. 2 is a block diagram of a straight forward decoding structure for the R-CQICH generated using the structure of FIG. 1. The output 50 of an MRC (Maximum Ratio Combiner) is used to construct a vector of eight symbols at 52 which is then converted to parallel form with serial-to-parallel converter 54. The eight outputs of the serial-to-parallel converter 54 are input to an 8-FHT (Fast Hadamard Transform) 56. The 8-FHT 56 has 8 outputs indicated i=1, i=2, . . . , i=8. The 8-FHT block 56 applies eight different Walsh covers to the output of the serial-to-parallel conversion 54. The maximum output of the 8-FHT 56 is selected at 58. This involves performing an energy accumulation for each output of the 8-FHT. Effectively this looks at the 8 outputs and identifies the channel number i of the channel having the largest energy. Then 12 symbols of the selected output are output at 60. The assumption at this point is that the sector for which the channel quality indicator was transmitted is the sector having the Walsh code cover associated with output i of the eight possible outputs of the 8-FHT 56. Then, depending upon whether it is the full update which is being decoded or the differential update which is being decoded, one of paths 66 or 68 is followed. For the full update, a switch 65 is switched to connect the output of the multiplier 64 to the path 66, and sequence de-repetition is performed as a function of the number of times the full update was repeated (this being 1, 2 or 4 in the above-identified examples) with symbol de-repetition block 70. The output of this block is fed to a (12,4) block decoder 72 which then produces the full channel quality update at 74. Typically, this channel quality will be a carrier to interference ratio (C/I). For the differential updates, the switch 65 is switched to connect the output of the multiplier 64 to the path 68, and symbol de-repetition is again performed at 76. In this case, the de-repetition factor would be 12 for the above example. Then, the differential update block 78 simply determines using a threshold whether or not the update was an increase or a decrease in one example, a "one" might reflect a 0.5 dB differential increase, whereas a "zero" might mean a 0.5 dB differential decrease. Disadvantageously, with this solution, if the signal quality is poor, the wrong sector may be decoded.

Figure 4:
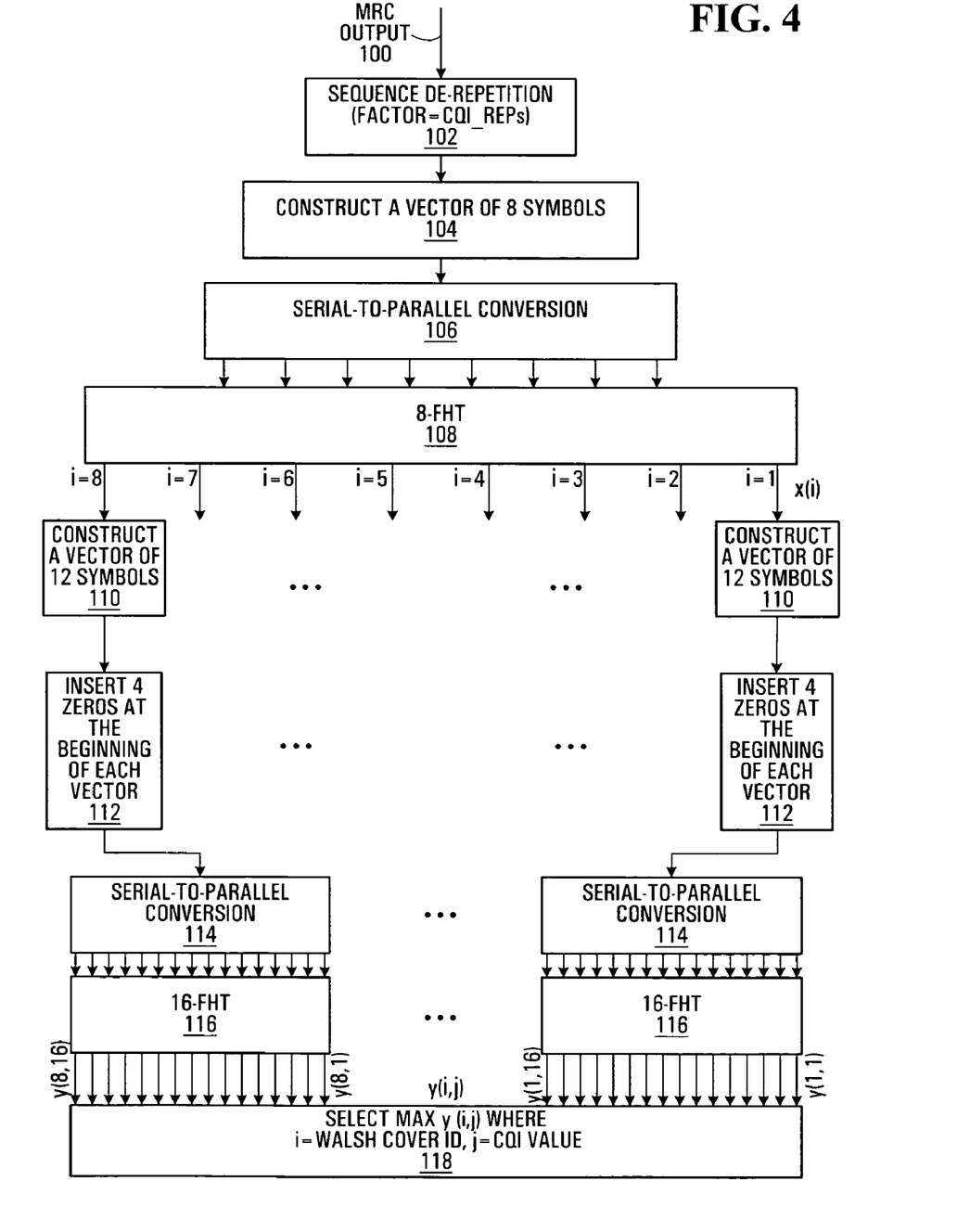
FIG. 4 is a block diagram of a structure for decoding the R-CQICH, as provided by an embodiment of the invention.

New decoding structures are provided for decoding the R-CQICH or DRC channels described above. FIG. 4 is a block diagram of an R-CQICH decoder provided by an embodiment of the invention. To begin, the output of maximum ratio combining, indicated at 100 is fed into a sequence de-repetition function 102. It is noted that while in preferred embodiments it is assumed that the input to the sequence de-repetition function 102 is an MRC output, other combining strategies may alternatively have been employed prior to the sequence de-repetition function 102. The structure of FIG. 4 is only used for the full CQI updates.

The sequence de-repetition function 102 performs sequence de-repetition as a function of the number of times the full CQI measurement was sent. As indicated previously, this may be 1, 2 or 4 times at the beginning of each set of 16 slots. However, it is to be understood that other numbers of repetitions could alternatively be employed. The output of the sequence de-repetition function 102 is used to construct a vector of eight symbols at 104 which is converted to parallel form with serial-to-parallel converter 106. This produces eight outputs. The eight outputs of the 8-FHT function are $x(i)$ for $i=1$ to 8. The value of $x(i)$ is the symbol value output by the 8-FHT function, and the subscript $i$ is indicative of the ith possible 8-Walsh code cover. It is noted that eight outputs are produced because length 8-Walsh covers were employed in generating the transmitted signal. If a different Walsh cover size was employed at the transmitter, a correspondingly different sized serial-to-parallel converter output would be generated.

The output of the serial-to-parallel converter 106 is input to an 8-FHT function 108. Again, if a different Walsh cover size was employed, a different sized FHT would be used at 108. The 8-FHT function 108 generates eight outputs with indicia $i=1, i=2, \ldots, i=8$. The 8-FHT function effectively multiplies the parallel output of the serial-to-parallel converter 106 by each of the eight possible 8-Walsh covers and produces a respective output for each Walsh cover.

Next, for each output, a respective vector of 12 symbols is generated. This is indicated at 110. Then, four zeros are inserted at the beginning of each vector at 112. After the addition of the four zeros to the beginning of each vector, there will be a 16 symbol vector which is then fed to a respective serial-to-parallel converter 114, again for each of the eight outputs of the 8-FHT block 108. Each serial-to-parallel converter 114 generates 16 outputs which are input to a respective 16-FHT function 116.

The 16-FHT function 116 performs a 16-FHT operation to generate 16 outputs. The outputs generated as a function of $x(1)$ are indicated to be $y(1,1), \ldots, y(1,16)$. More generally, the outputs associated with output symbols $x(i)$ will be $y(i,j)$ for $j=1$ to 16. Thus in total, there will be $8 \times 16 = 128$ outputs of the 16-FHT functions 116. For each output $y(i,j)$ the index $i$ is indicative of a particular Walsh cover, and the index $j$ is indicative of a CQI value.

Finally, at 118 the step of selecting the maximum of all the outputs $y(i,j)$ output by the various 16-FHT functions 116 is performed. Once the maximum such value is identified, the subscript $i$ associated with this maximum value will be indicative of the Walsh cover and hence the sector, and the subscript $j$ associated with this maximum value will be the new CQI value.

It can be seen that unlike the approach of FIG. 2, this approach jointly detects both the Walsh cover and CQI value. This may make detection more reliable than the approach of FIG. 2 thereby increasing forward and reverse link capacity.

It is noted that the 12 outputs that are constructed into a vector correspond to a (12,4) block code. Adding four zeros to this will make a vector of length 16 which is then suitable for the 16-FHT function 116 implementation. The zeros can be added at the beginning or the end.

Recall that at the transmitter, before being covered by the 8-Walsh cover, a block coding function is applied. In the DV Standard, this is a (12,4) block encoding function for full C/I updates. Effectively, what this code does is to take 4 bits representing a CQI value, and map these to a particular 16-Walsh cover, and then only transmit output 12 out of 16 of these bits. In other words, the encoding that is applied is the first 12 of 16 bits of each Walsh cover. Then, the four zeros are reinserted at 112 of FIG. 5 to produce a 16 symbol vector. The 16-FHT function 116 is effectively performing a multiplication of the (12,4) block code for each of the 16 possible Walsh covers. By inserting zeros for four of the inputs, the 16-FHT effectively generates outputs corresponding to the truncated Walsh codes applied at the transmitter. The structure of FIG. 4 only needs to be employed to decode the full CQI measurements. This is because the Walsh cover used for this measurement needs to also be determined as part of the decoding process.

Figure 5:
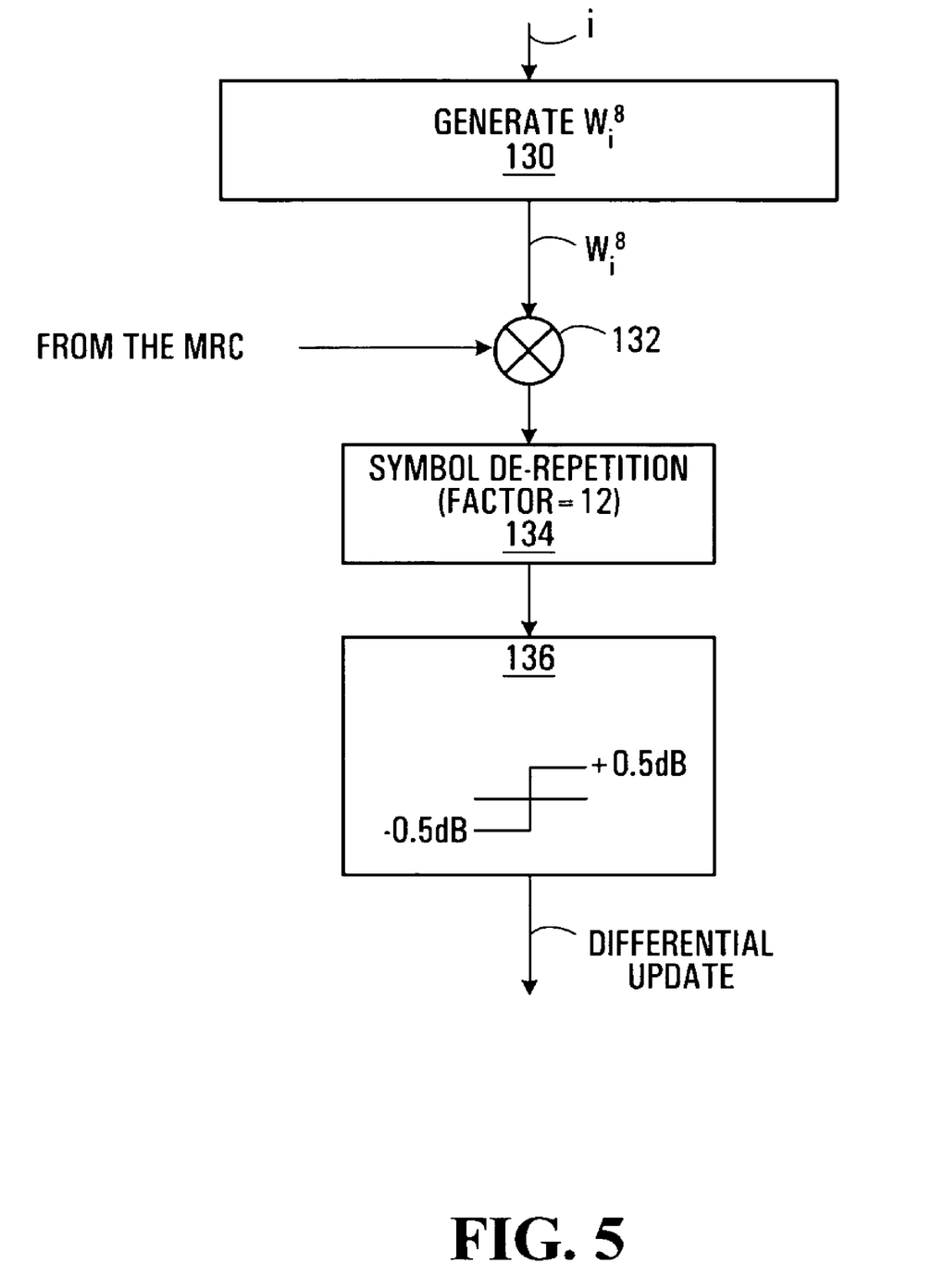
FIG. 5 is a block diagram of how differentially generated updates may be decoded.

Once the Walsh cover/sector identifier is decoded using the structure of FIG. 4, the conventional approach of decoding the differential updates can be employed. This is shown in FIG. 5. The indicia $i$ indicating the sector identifier will already have been determined using the structure of FIG. 4 and is used at 130 to generate the appropriate Walsh cover. This is multiplied 132 by the output from the MRC. This is then fed through symbol de-repetition function 134 having de-repetition factor 12 which is then output to differential update block 136 which generates the required output. The structure of FIG. 4 could also be used to decode differential updates. Different repetition factors would need to be implemented.

Figure 6:
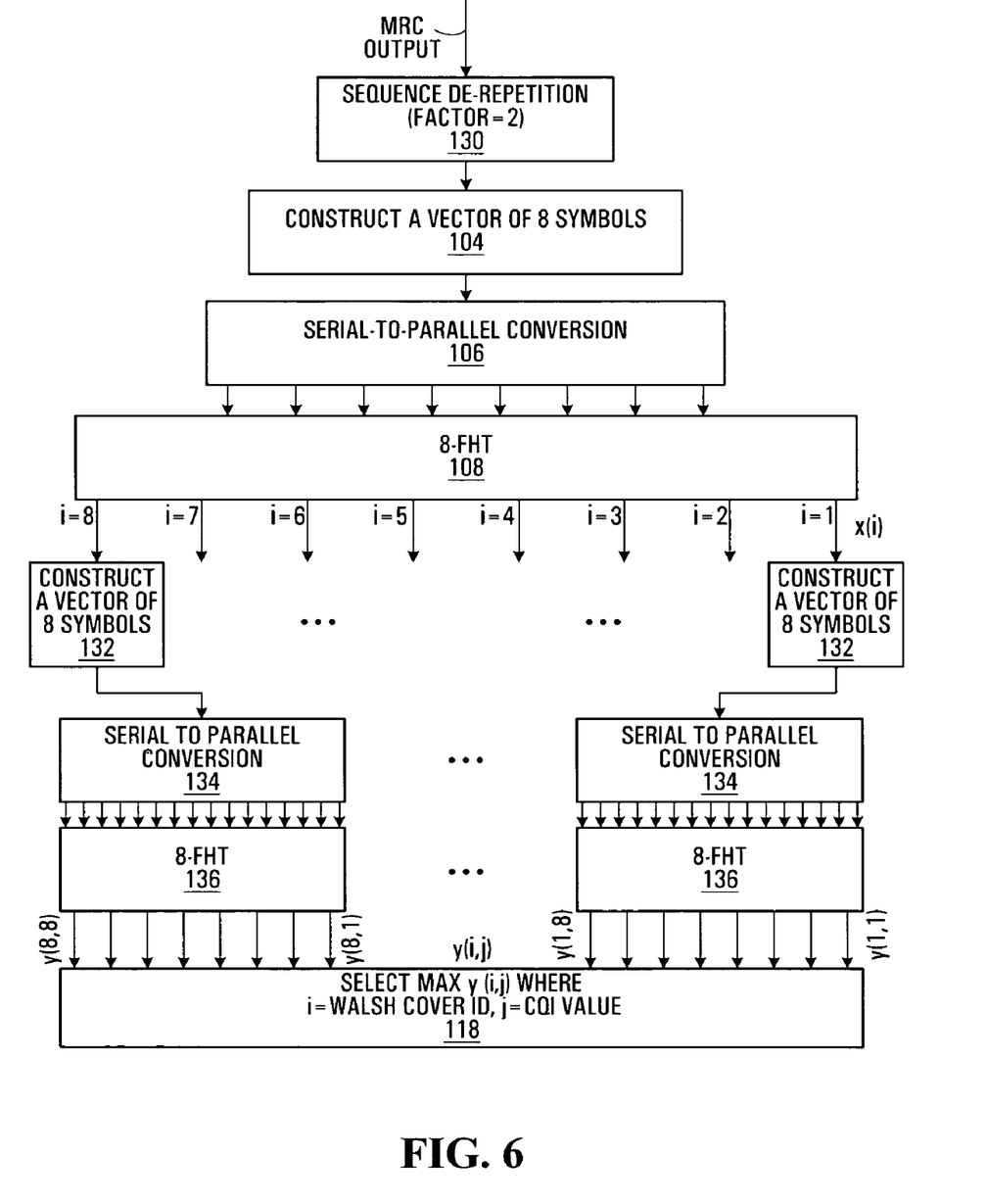
FIG. 6 is a block diagram of a structure for decoding the DRC, as provided by another embodiment of the invention.

Referring now to FIG. 6, shown is a block diagram of a decoder structure for use in DO systems. This structure is similar to that of FIG. 4, but different values are employed. In particular, in the de-repetition function 130, the factor used is 2 since the bi-orthogonal code with repetition factor 2 was employed in the transmitter (see reference number 82 of FIG. 3). Another difference is that at the output of the 8-FHT function 108, vectors of eight symbols are constructed as indicated at 132 rather than vectors of 12 (110 of FIG. 4). This is because the bi-orthogonal encoder 80 of FIG. 3 generated eight symbols per slot whereas the (12,4) encoder of FIG. 1 generated 12 symbols per slot. There is no need to add any zeros to pad the length of the vector to be suitable for processing by an FHT function. As such, serial-to-parallel conversion converts the eight symbol vectors to eight parallel outputs at 134 and this is then fed to the 8-FHT function 136. Each 8-FHT function 136 generates eight outputs, and as such there are 64 outputs in total indicated at $y(i,j)$. Once again, the maximum of these values is identified, and the index $i$ of this maximum will indicate the Walsh cover ID, and the index $j$ of this value will indicate the CQI value.

The examples of FIGS. 4 and 6 share the feature that to begin an FHT function is applied to remove the Walsh cover for each of the possible sectors. Then, a second FHT function is applied for each possible CQI or DRC value. The output of the second FHT jointly identifies both the sector and the CQI or DRC value. The particular size of the first FHT and the second FHT will be dictated by the particular encoding performed at the transmitter. Furthermore, in some embodiments there will need to be some sequence de-repetition in the event this symbol repetition was performed as part of the encoding at the transmitter. Zero insertion will also need to be employed in the event that the length of the code used was not an even multiple of a power of 2.

The FHT function is particularly suited for Walsh codes. It is to be understood that there may be other sets of codewords for which a function analogous to FHT can be defined. Preferably the code chosen is an orthogonal code. In this case, a sector ID may be transmitted by employing a particular one of these orthogonal codewords. A sector identification parallel de-spreading function would then produce an output for each possible orthogonal codeword. This sector identification parallel de-spreading function would be analogous to the FHT, but for a different set of codeword.

Similarly, a code other than a Walsh cover or truncated Walsh cover may have been employed in encoding the CQI value at the transmitter. In this case, rather than using an FHT in the second stage of decoding (FHT 116 of FIGS. 4 and 136 of FIG. 6) another parallel decoding function could be implemented which reflected the particulars of the codes used in the transmitter. The function would apply all the possible codewords used at the transmitter to generate parallel outputs for each of these codes. Then, each output of a given parallel code de-spreader would indicate a particular sector identification code and a particular of the codewords used for the CQI or DRC value.

In the embodiments of FIGS. 4 and 6, the second FHT function (116,136) is implemented for all of the outputs of the 8-FHT function. In another embodiment, a subset of the 8 outputs are selected for further processing. For example, the three best outputs of the 8-FHT may be selected and processed using a secondary FHT. The particular outputs for further processing can be selected by accumulating energy from each output of the 8-FHT function 108 according to $$\sum_{1}^{12} x(i)^2,$$

and selecting the outputs having the largest energy. In one embodiment only one output is selected. In preferred embodiments, at least two outputs are selected.

In the above-described embodiments, the structure at the transmitter has been implemented to transmit channel quality indicator values and sector identifiers. It is noted that the same structure could be used to transmit any information, not limited to the particulars of channel quality indication and sector identifiers. More generally, this information could also be any appropriate information that needs to be transmitted from the transmitter to a receiver.

Figure 7:
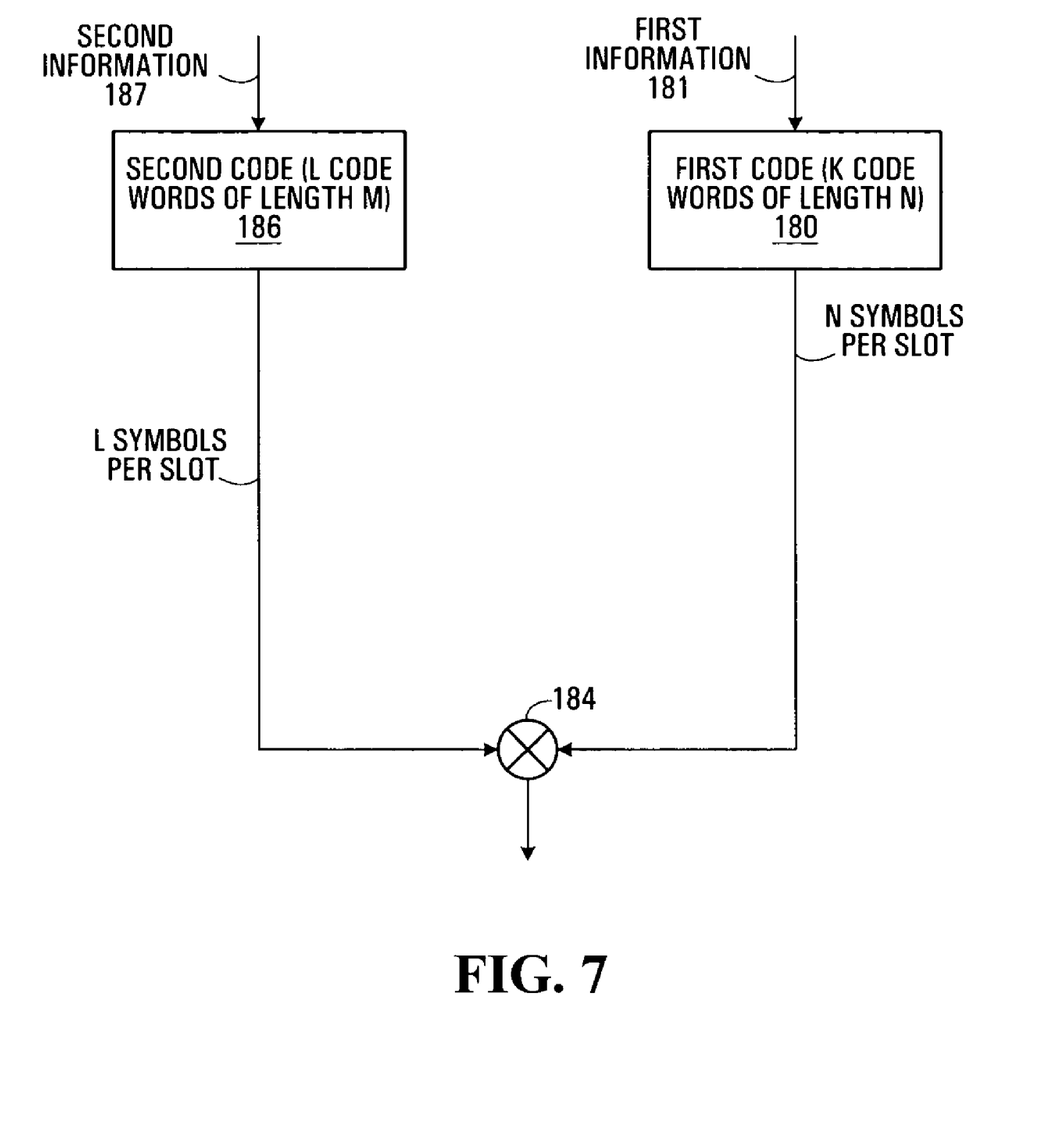
FIG. 7 is a block diagram of an encoder for a generic R-CQICH-like channel.
Figure 8:
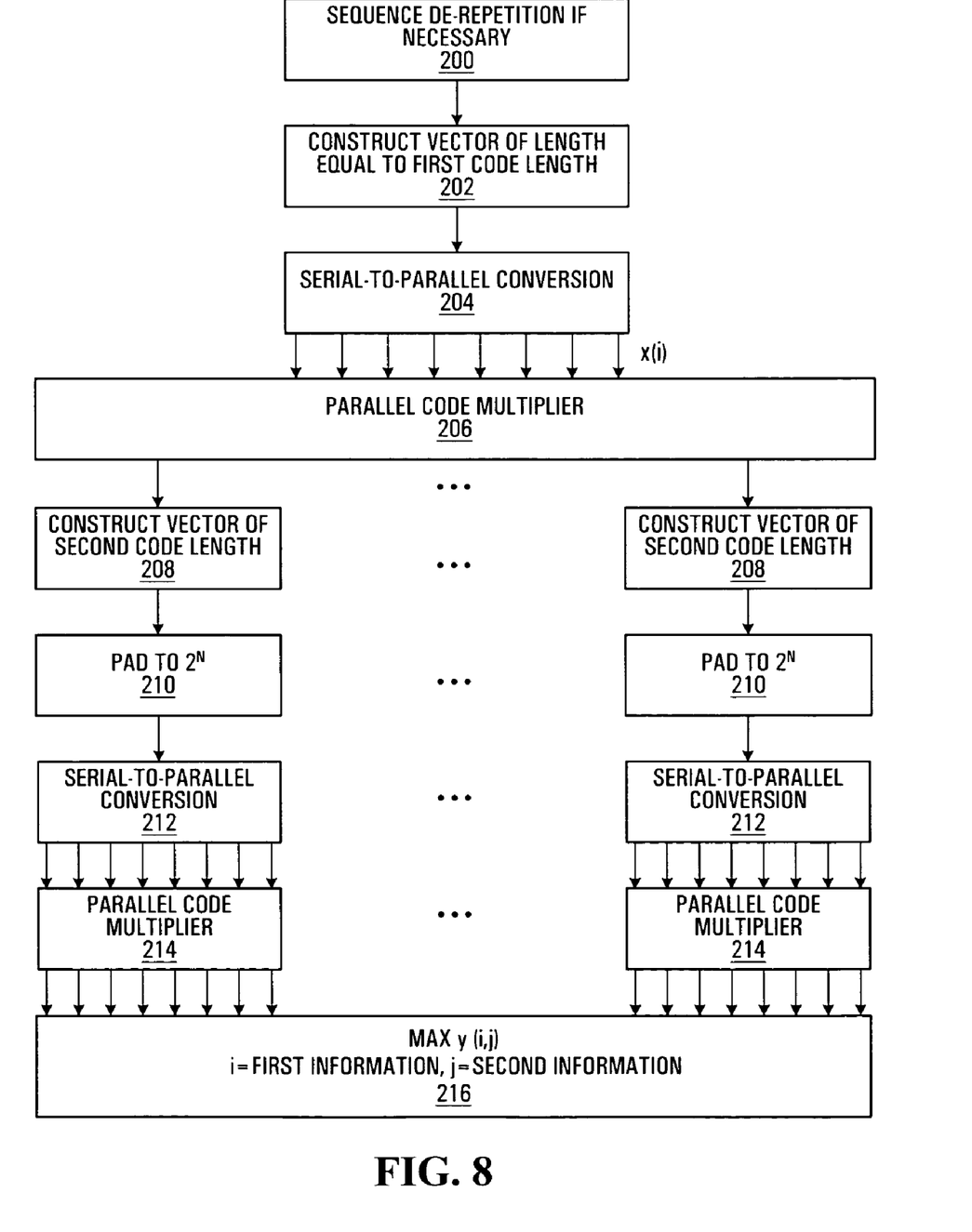
FIG. 8 is a block diagram of a structure for decoding a generic R-CQICH-like channel.

Referring now to FIGS. 7 and 8, shown is a block diagram of a very generic encoder and decoder provided by an embodiment of the invention. In this example, it is assumed that a first code 180 is employed for conveying a first piece of information 181, and a second code 186 is used to convey a second piece of information 187. The second code 186 is used to spread the output of the first code 181 with multiplier 184. In the previous examples, the second code was an 8-Walsh code and the first code was a (12,4) block code based on truncated 16-Walsh codes. In the embodiment of FIGS. 7 and 8, it is contemplated that different sets of codes can be employed. Furthermore, in the above embodiments, the first piece of information was a sector identification and the second piece of information was a channel quality indicator. It is contemplated in FIGS. 7 and 8 that other types of information may instead be transmitted using these types of channels. It is noted that sequence repetition may be included in the generic structure.

Depending on the structure used at the transmitter, sequence de-repetition is performed if necessary 200. Following this, a vector is constructed at 202 of a length equal to the first code. This is followed by a serial-to-parallel conversion 204. The output of the serial-to-parallel conversion 204 is fed into the parallel code multiplier 206. This parallel code multiplier multiplies the parallel input by each of the possible code words of the first code. Each output of the parallel code multiplier 206 is used to construct a respective vector having a length equal to the second code length, as indicated at 208. Then, in the event there is some hardware advantage to doing so, the vector thus constructed is padded to a length of a power of 2, namely $2^N$. However, it is to be understood that depending upon the second code, it may be appropriate to pad the vector to some other length which is most efficiently processed in hardware. Furthermore, it may not always be necessary to perform any padding. Following the padding 210, serial-to-parallel conversion is executed at 212 and then a second parallel code multiplier function is implemented at 214. Here, the output of the serial-to-parallel conversion function 212 is multiplied by each of the possible code words of the second code. The outputs of all of the second parallel code multipliers 214 are input to a maximum determination function 216 which determines the maximum of all of the outputs as in the previous embodiments. If the inputs to the maximum function 216 are indexed i and j as before, then max (i,j) will indicate that the first information is that associated with the index i and the second information is that associated with the index j.

In preferred embodiments of the invention, all of the functions required to perform the channel decoding are implemented in hardware. For example, the entire structure of FIG. 5 could be implemented in a single ASIC (Application Specific Integrated Circuit), FPGA, digital signal processor, or other custom piece of hardware. It is also to be understood that the entire functionality could be implemented in software, but this would be much slower. Alternatively, the structure could be implemented using a combination of software and hardware.

We claim:

1. A method in a wireless receiver of decoding M×N symbols in which a first codeword of length N of a first set of K codewords has been spread by a second codeword of length M of a second set of L codewords, the first codeword identifying a first information and the second codeword identifying a second information, the method comprising:

receiving the M×N symbols via an air interface of the wireless receiver;

for each set of M consecutive symbols, performing a first parallel code multiplying operation by multiplying the M symbols by each of the L codewords of the second set of codewords, thereby producing L first output symbols, each of the L first output symbols being associated with one of the L codewords;

for each of at least one codeword of said set of L codewords:

for a set of N consecutive first output symbols associated with the codeword, performing a respective second parallel code multiplying operation by multiplying the set of N consecutive first output symbols by each of the K codewords of the first set of codewords to produce a set of K second output symbols, each second output symbol being associated with one of the K codewords and with said codeword of the set of said L codewords;

determining an overall maximum second output symbol of the second output symbols produced by said second parallel code multiplying operation; and determining the first information from the codeword of the first set of codewords associated with the overall maximum second output symbol and determining the second information from the codeword of the second set of codewords associated with the overall maximum second output symbol.

2. A method according to claim 1 wherein the first set of codewords is a Walsh code, and the second parallel code multiplying operation comprises a FHT (Fast Hadamard Transform).

3. A method according to claim 2 wherein M=8, N=8, L=8, K=8 the first set of codewords is an 8-Walsh code, and the second set of codewords is an 8-Walsh code.

4. A method according to claim 3
wherein the first information comprises a data rate control indication, and wherein the second information comprises a sector identifier.

5. A method according to claim 1 wherein the first set of codewords is a truncated Walsh code, the method further comprising padding each set of N consecutive output symbols to a power of 2, wherein the second parallel code multiplying operation comprises a FHT.

6. A method according to claim 5 wherein the second set of codewords is a Walsh code, and the first parallel code multiplying operation comprises a FHT.

7. A method according to claim 6 wherein M=8, N=12, L=8, K=16, the second set of codewords is an 8-Walsh code, and wherein the first set of codewords is a truncated Walsh code in the form of a (12,4) block code which is padded to length 16.

8. A method according to claim 7
wherein the first information comprises a channel quality indication, and wherein the second information comprises a sector identifier.

9. A method according to claim 1 wherein the second set of codewords is a Walsh code, and the first parallel code multiplying operation comprises a FHT.

10. A method according to claim 1 wherein the second set of codewords is an orthogonal code.

11. A method according to claim 1 further comprising:
performing sequence de-repetition prior to said first parallel code multiplying operation.

12. A method according to claim 1 wherein said second parallel code multiplying operation is performed for at least 2 of the L codewords.

13. A method according to claim 1 wherein said second parallel code multiplying operation is performed for all of the L codewords.

14. A method according to claim 1 wherein said at least one codeword are fewer than all of the L codewords, and the at least one codeword is selected by accumulating energy after the first parallel code multiplying operation for each possible codeword after the first parallel code multiplying operation, and selecting the at least one codeword having greatest energy.

15. An apparatus for decoding M×N symbols in which a first codeword of length N of a first set of K codewords has been spread by a second codeword of length M of a second set of L codewords, the first codeword identifying a first information and the second codeword identifying a second information, the apparatus comprising:

a wireless receiver configured to receive the M×N symbols wirelessly;

a first parallel code multiplier which, for each set of M consecutive symbols, performs a first parallel code multiplying operation by multiplying the M symbols by each of the L codewords of the second set of codewords, thereby producing L first output symbols, each of the L first output symbols being associated with one of the L codewords;

a second parallel code multiplier which, for each of at least one codeword of said set of L codewords, performs:

for a set of N consecutive first output symbols associated with the codeword, a respective second parallel code multiplying operation by multiplying the set of N consecutive first output symbols by each of the K codewords of the first set of codewords to produce a set of K second output symbols, each second output symbol being associated with one of the K codewords and with said codeword of the set of said L codewords;

wherein an overall maximum second output symbol of the second output symbols produced by said second parallel code multiplying operations is selected, the first information is determined from the codeword of the first set of codewords associated with the overall maximum second output symbol and the second information is determined from the codeword of the second set of codewords associated with the overall maximum second output symbol.

16. An apparatus according to claim 15 wherein the first set of codewords is a Walsh code, and the second parallel code multiplying operation comprises a FHT (fast Hadamard transform).

17. An apparatus according to claim 16 wherein M=8, N=8, L=8, K=8 the first set of codewords is an 8-Walsh code, and the second set of codewords is an 8-Walsh code.

18. An apparatus according to claim 15 wherein the first set of codewords is a truncated Walsh code, the apparatus being further adapted to pad each set of N consecutive output symbols to a power of 2, wherein the second parallel code multiplier comprises a FHT.

19. An apparatus according to claim 18 wherein the second set of codewords is a Walsh code, and the first parallel code multiplier comprises a FHT.

20. An apparatus according to claim 19 wherein M=8, N=12, L=8, K=16, the second set of codewords is an 8-Walsh code, and wherein the first set of codewords is a truncated Walsh code in the form of a (12,4) block code which is padded to length 16.

21. An apparatus according to claim 15 wherein the second set of codewords is a Walsh code, and the first parallel code multiplier comprises a FHT.

22. An apparatus according to claim 15 wherein the second set of codewords is an orthogonal code.

23. An apparatus according to claim 15 further comprising:
a sequence de-repetition function adapted to perform sequence de-repetition prior to said first parallel code multiplier.

24. An apparatus according to claim 15 wherein the first information comprises a channel quality indication, and wherein the second information comprises a sector identifier.

25. An apparatus according to claim 15 wherein the first information comprises a data rate control indication, and wherein the second information comprises a sector identifier.

26. An apparatus according to claim 15 wherein the second parallel code multiplying operation is performed for at least 2 of the L codewords.

27. An apparatus according to claim 15 wherein the second parallel code multiplying operation is performed for all of the L codewords.

28. An apparatus according to claim 15 wherein said at least one codeword are fewer than all of the L codewords, and the at least one codeword is selected by accumulating energy for each possible codeword after the first parallel code multiplying operation, and selecting the at least one codeword having greatest energy.

* * * * *

UNITED STATES PATENT AND TRADEMARK OFFICE
CERTIFICATE OF CORRECTION

PATENT NO. : 7,649,994 B1  Page 1 of 1
APPLICATION NO. : 10/697309
DATED : January 19, 2010
INVENTOR(S) : Abdelgader Legnain et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1335 days.

Column 4, line 20, "...control channel as defined in IS 856 Air Interface Standards" should read --...control channel as defined in IS 856 Air Interface Standards;--

Signed and Sealed this

Tenth Day of August, 2010

David J. Kappos
*Director of the United States Patent and Trademark Office*